UNITED STATES PATENT OFFICE.

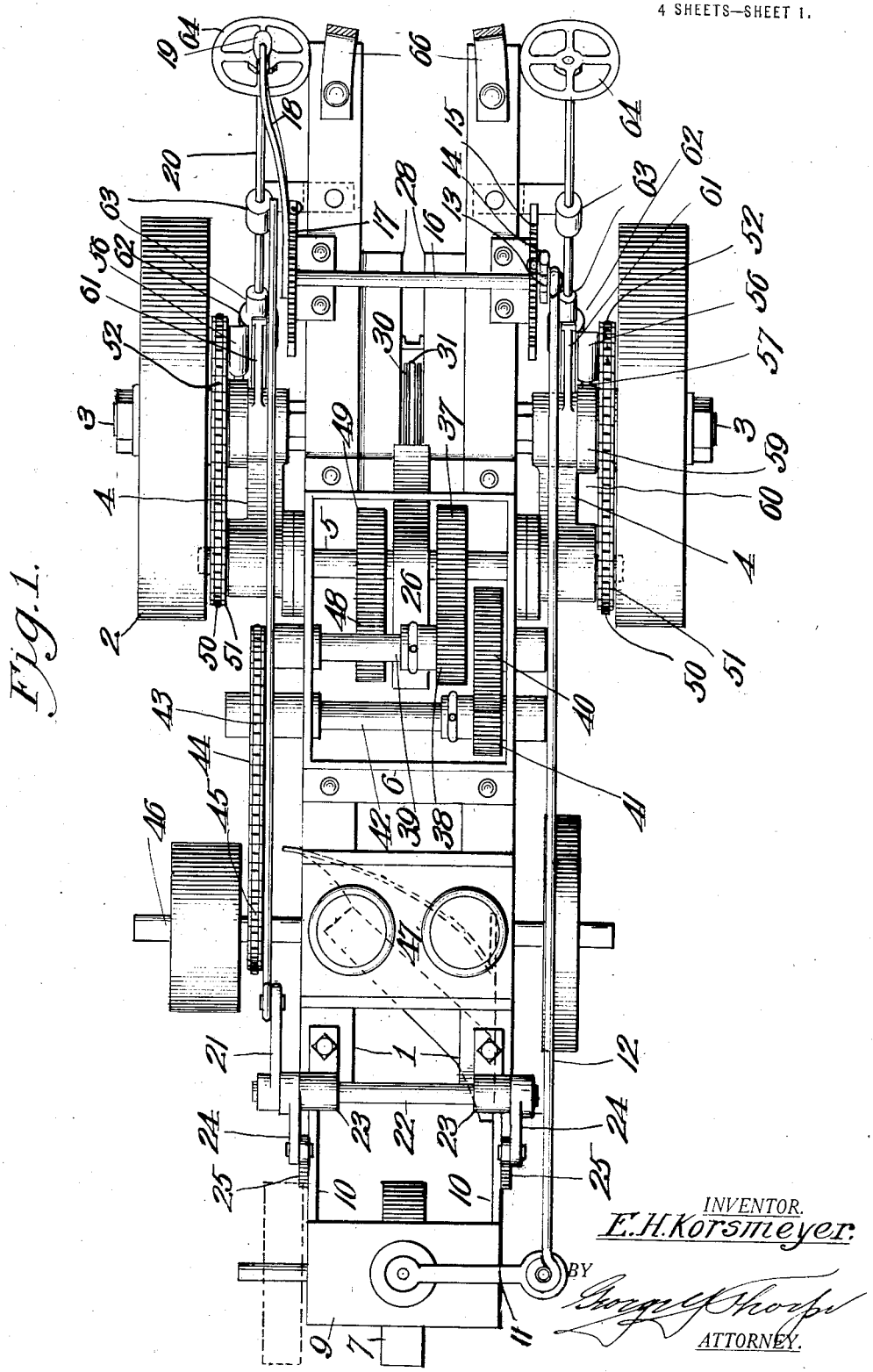

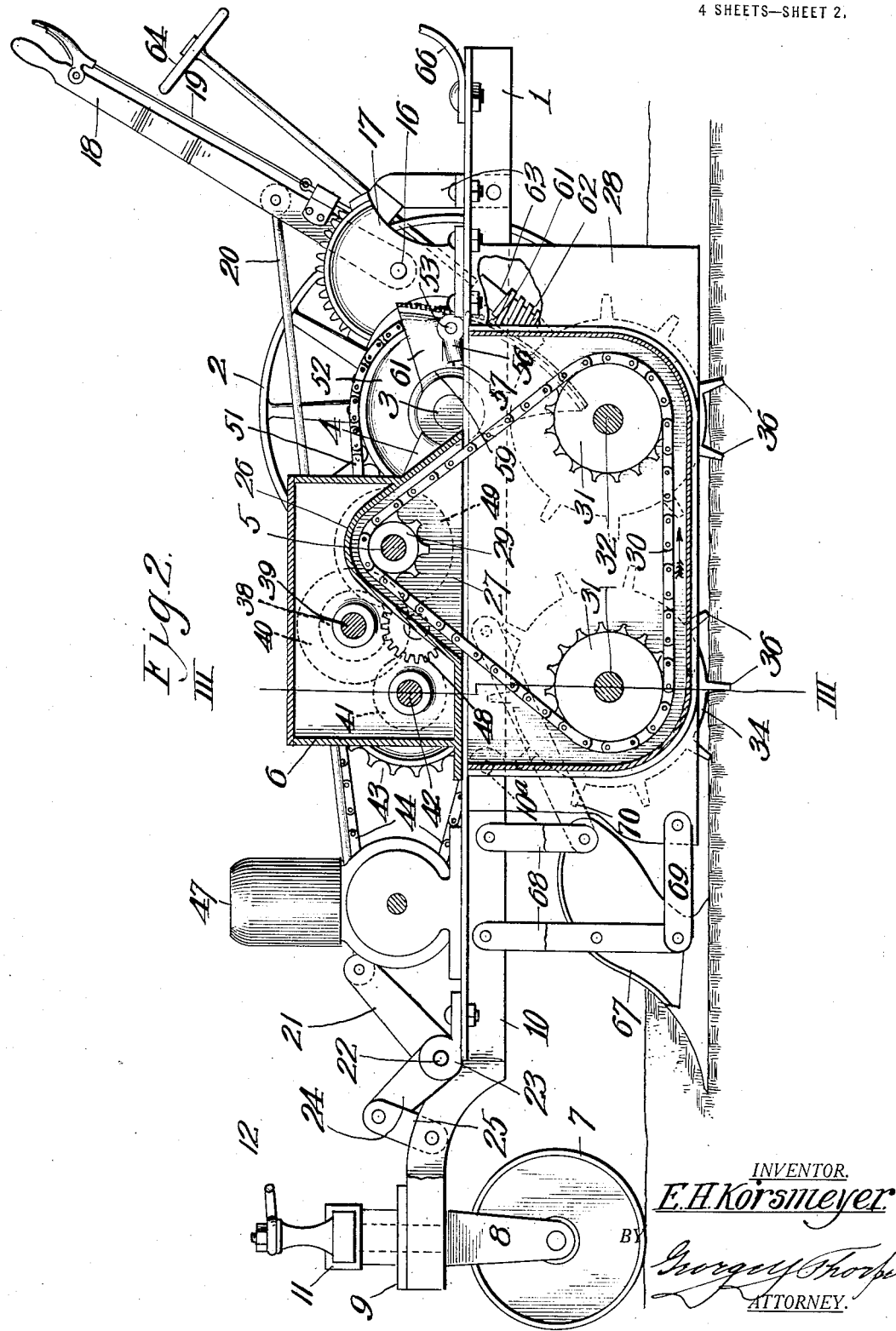

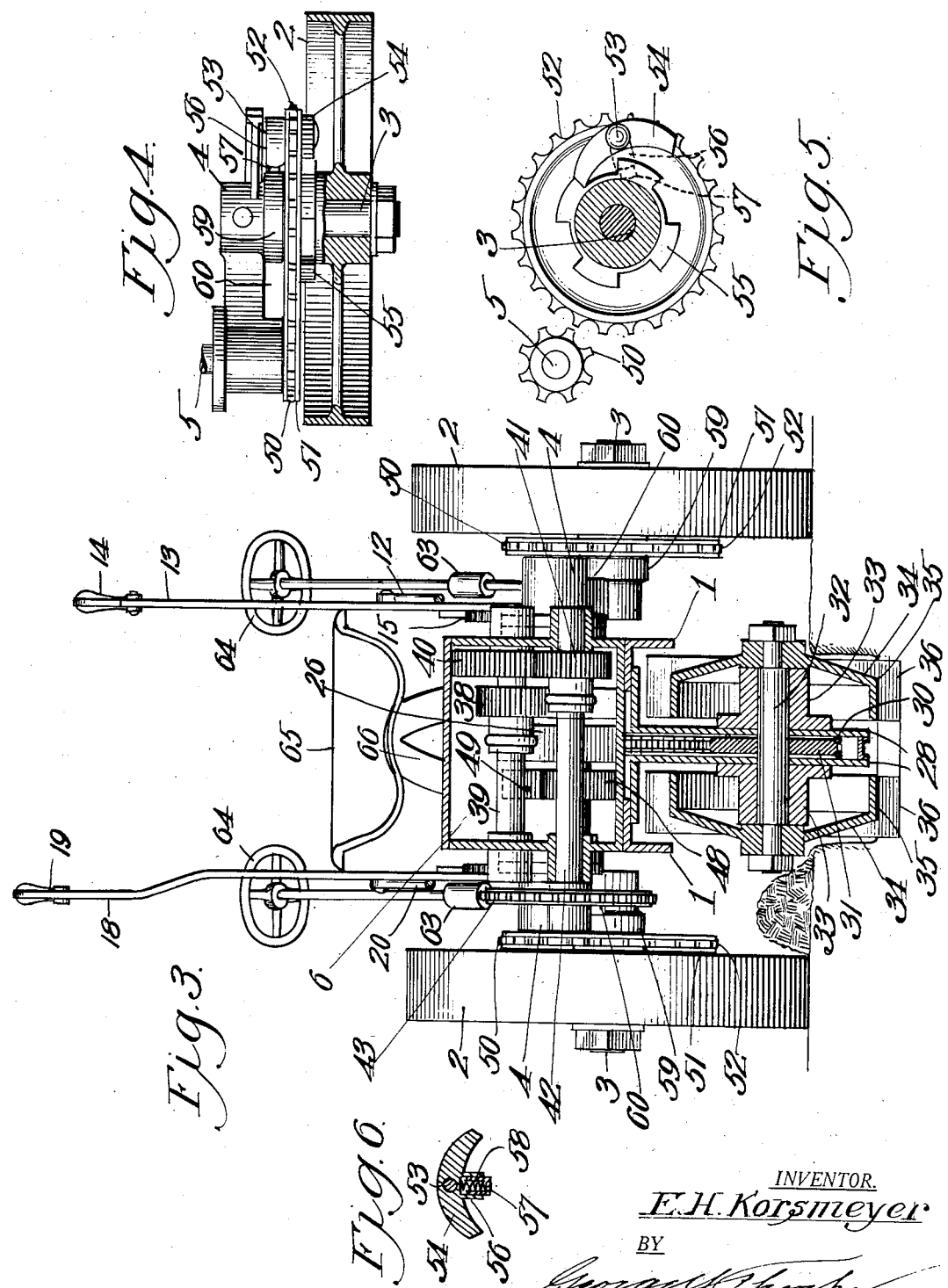

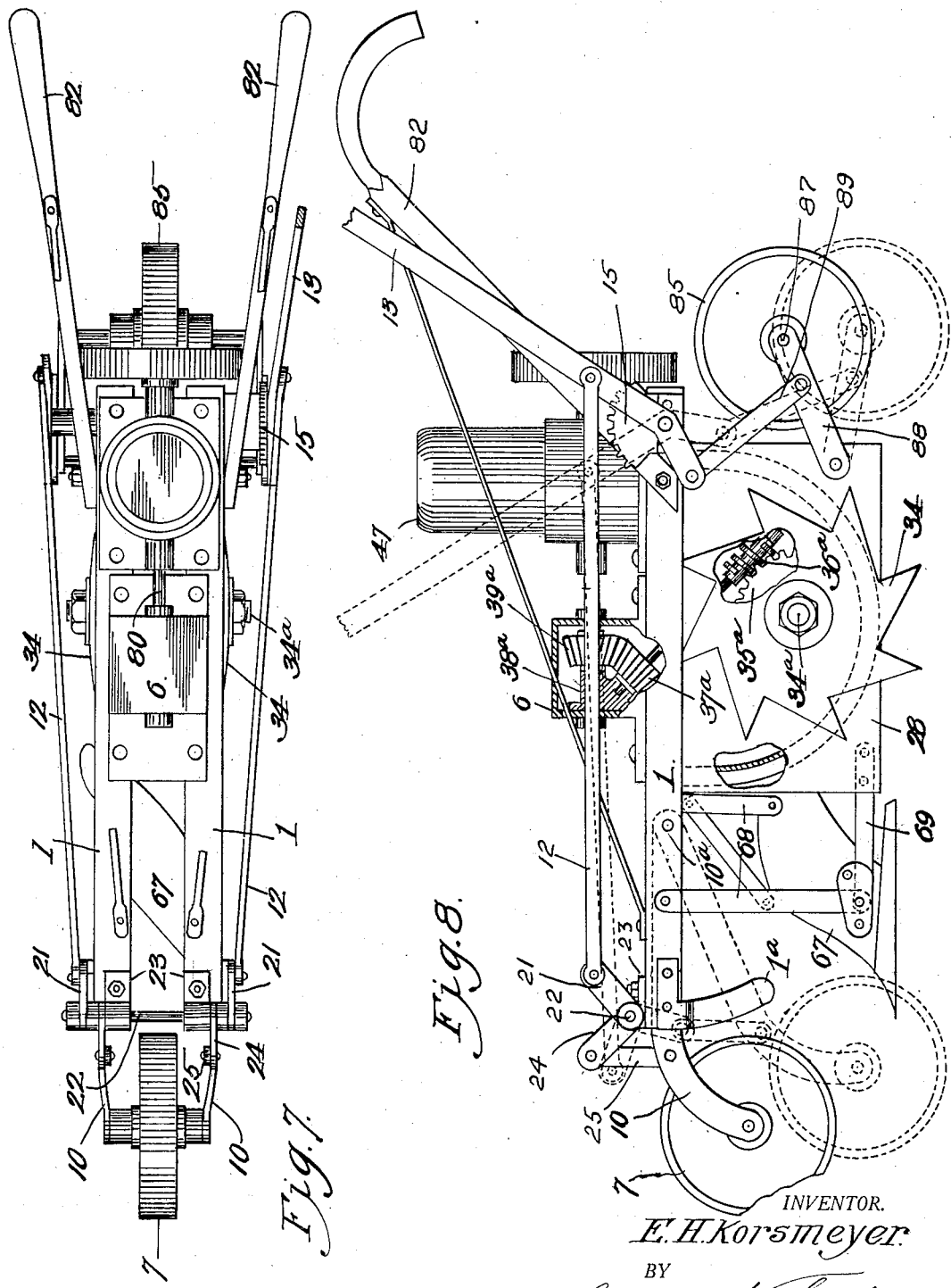

ERNEST H. KORSMEYER, OF KANSAS CITY, MISSOURI.

MOTOR PLOW.

1,412,308.  Specification of Letters Patent.  Patented Apr. 11, 1922.

Application filed June 8, 1920. Serial No. 387,335.

*To all whom it may concern:*

Be it known that I, ERNEST H. KORSMEYER, a citizen of the United States, residing at Kansas City, in the county of Jackson and State of Missouri, have invented certain new and useful Improvements in Motor Plows, of which the following is a specification.

This invention relates to motor plows and has for its object to produce a machine of this character provided with a traction mechanism which in the plowing operation, travels behind the plow and within the furrow made thereby and utilizes the sub-soil as a footing resistance or leverage point in the propulsion of the machine. A further object is to produce a machine of the character set forth, provided with carrying wheels adjustable relative to each other and to the plow to provide for the production of furrows of different depths, and for the operation of the machine with the carrying wheels at opposite sides on broken or plowed ground and on unbroken or unplowed ground and for operation on hill sides.

With these general objects in view the invention consists in certain novel and useful features of construction and organization of parts as hereinafter described and claimed; and in order that it may be fully understood reference is to be had to the accompanying drawings, in which:

Figure 1, is a top plan view of a motor plow embodying the invention.

Figure 2, is a view showing the major portion of the plow in central, vertical longitudinal section.

Figure 3, is a cross section taken on the line III—III of Figure 2.

Figure 4, is a fragmental view partly in plan and partly in section of a carrying wheel and the crank arm therefor, and mechanism for automatically reversing application of power to said wheel.

Figure 5, is a vertical section taken through the hub of the wheel shown in Figure 4, to further illustrate the mechanism for reversing the application of power to the wheel.

Figure 6, is a section of a dog forming a part of the power reversing mechanism of Figures 4 and 5.

Figure 7, is a plan view of a garden plow embodying the invention.

Figure 8, is a side view of the same.

Referring first to the machine shown upon Sheets 1 to 3 inclusive, which machine is intended for general farm service, a suitable framework comprises essentially parallel angle bars 1, and said framework is provided with a pair of carrying wheels 2, journaled upon suitable shafts 3 projecting outward from crank arms 4 secured rigidly upon the ends of a transverse shaft 5 journaled in a gear casing 6 rigidly secured upon angle bars 1 of said framework.

At the front end of the machine is a caster 7 mounted in a bracket 8. The bracket has its stem swiveled in a bearing plate 9 connecting the ends of extension arms 10 of the frame. The extension arms fit flatly against the inner sides of the bars 1 and are pivoted at their rear ends at 10ª to said bars 1 so as to be capable of being swung vertically downward and thus raise or lower the front end of the framework, and parts carried thereby. The stem of the caster wheel bracket is provided with a laterally projecting crank arm 11 to which is pivotally connected the front end of a rod 12 pivotally connected at its rear end to a lever 13 at the rear end of the machine. Said lever is provided with a latch mechanism 14 for engagement with a sector 15, the lever being pivoted upon the cross rod 16 connecting sector 15 with a similar sector 17 at the opposite side of the machine. A second lever 18 is pivoted on the rod 16 and is provided with a latch mechanism 19 for engagement with the sector 17. The lever 18 is for effecting the vertical adjustment of the front end of the framework hereinbefore mentioned, and is pivotally connected by a link 20 with a crank arm 21 of a rock shaft 22 journaled in brackets 23 secured upon the front ends of bars 1. Said transverse shaft also has a pair of crank arms 24 pivotally connected by links 25 to the extension arms 10. It will be seen by reference to Figure 2 that when lever 18 is pushed forward, the crank arms 24 will fulcrum on the links 25 and thus raise the front ends of the bars 1 of the framework, reverse action of the lever permitting the elevated end of the framework to drop down until limited by the engagement of the extension arms 10 with the horizontal arms of the angle bars 1.

The gear casing has an arched portion 26 to provide an external downwardly opening chamber 27 through which shaft 5 extends. Chamber 27 opens into an underlying chamber formed by and between a pair of plates 28 secured to and depending from bars 1, the last-named chamber being adapted to contain lubricating oil or grease. The shaft 5 carries within chamber 27, the sprocket wheel 29 connected by a chain 30 to a pair of sprocket wheels 31 respectively rigidly secured upon shafts 32, journaled in bearings 33 secured to plates 28, and mounted rigidly upon the outer ends of said shafts are toothed wheels 34, the said wheels having tread or peripheral portions 35 to run upon the ground and teeth or spurs 36 to be embedded in the ground and thus utilize the latter as a resistance in propelling the machine as hereinafter more particularly referred to.

To impart rotation to shaft 5, it is equipped with a gear wheel 37 meshing with a gear wheel 38 on a shaft 39 extending through and journaled in the gear casing, and said shaft is provided with a gear wheel 40 meshing with a smaller gear wheel 41, on a transverse shaft 42 journaled in the casing and provided at its outer end with a sprocket wheel 43 connected by a chain 44 with a sprocket wheel 45 on a shaft 46 of a motor 47, which motor may be of any preferred type.

The operation of the engine will through the sprocket and cog gearing described, impart movement to the chain 30 in the direction indicated by the arrow, Figure 2, and hence cause the traction device composed of toothed wheels 34, to impart low speed forward travel to the machine.

Within the casing 6 and forming a part of the transmission mechanism is a suitably journaled gear wheel 48, permanently intergeared with a gear wheel 49 rigidly secured on shaft 5. When it is desired to propel the machine at its maximum speed, gear pinion 41 is shifted by any suitable means, not shown, until engaged with the idler gear 48, the operation of which by gear 41, will transmit power to gear 49 at greater speed than the same is turned when pinion 41 is in mesh with gear wheel 40, and the power is transmitted from the latter to shaft 5, through pinion 38 and gear wheel 37. It will be readily seen that by shifting gear pinion 38 by any suitable means, not shown, from engagement with gear wheel 37 to engagement with the idler gear 48, reverse travel may be imparted to the propulsion device comprising the toothed wheels 34. As there is nothing novel in the transmission mechanism, the customary shift levers for effecting a change in direction or speed, are omitted.

As it is desirable at times to utilize the carrying wheels 2 as drive wheels, as when the machine is traveling to and from a field of operation, and sometimes to utilize the said wheels to aid the propulsion device, small sprocket wheels 50 are secured on the outer ends of shaft 5 and are connected by chains 51 with large sprocket gears 52 journaled on the stub shafts 3 between the cranks 4 and the wheels 2. Each wheel 52 carries a rotatable pin 53 equipped at one end with a rigid double pawl 54 for engagement with the notched wheel 55 rigid with the adjacent wheel 2. At the opposite side of each wheel 52, the said pin 53 is provided with a tubular crank arm 56 provided with a friction pin 57 held pressed outward by an expansion spring 58 (see Figure 6), the arrangement being such that when the pawl is in the position shown by Figure 5, and the machine is to be propelled in a forward direction, the sprocket wheels 52 turn in the direction indicated by the adjacent arrow in Figure 5, and hence through their pawls 54, impart like movement to the wheels 2. In the event the power on the sprocket wheels is reversed, they carry the pawls in the opposite direction to that indicated, and the engaged ends of said pawls are forced out of the notches of wheels 55, against the resistance of the spring-advanced pins 57 in engagement with the circular enlargements 59 of the crank arms 4, which frictional engagement under the backward turning of the sprocket wheels 52, snaps the opposite ends of the pawls in engagement with other notches of wheels 55, and said pawls are held in such position by the reaction of the spring-pressed pins, which thus serve to retain the pawls in proper position for advance or backward movement of the machine, and automatically reverse the positions of the pawls when the direction of rotation of the sprocket wheels is changed. By reference particularly to Figure 1, it will be noticed that the crank arms are formed with recesses 60 to accommodate the passage of the tubular arms of pins 53, in the rotation of sprocket wheels 52.

As it is necessary to operate the machine at times with one of the carrying wheels 2 higher than the other as on a hill side, each wheel is susceptible of independent vertical adjustment. Any suitable means may be employed to accomplish this result, but my preferred means is to provide each crank arm 4 with a quadrant-shaped worm gear 61, respectively engaged by a worm 62. The shafts of the worms 62 are journaled in suitable brackets 63 secured to the frame, and are operable by hand wheels 64, within convenient reach of the driver upon a seat 65 mounted upon supporting springs 66, secured to the rear ends of the frame, it being noted that the driver can also readily reach either of the levers 14 or 18, for the purpose of steering the machine or vertically adjusting the front part of the frame. Proper adjustment of the wheels 2 and of the front end of the frame, will accommodate the machine for operation in a furrow of any desired depth, with both wheels 2 upon unbroken ground or above and out of contact with the same, or with one of said wheels upon unbroken ground and the other on plowed or broken ground. By proper adjustment of said levers 14 and 18, the propulsion device described, together with the plow 67 immediately preceding it, can be raised above the ground as is necessary when traveling along the roadway. The plow is secured to the lower ends of a pair of bars 68, and is also connected by bars 69 and 70, to rigid parts of the machine.

Referring now to Figures 7 and 8 which show a garden plow embodying the same principle of construction as the plow already described, it will be noted that corresponding parts are correspondingly numbered. In this case the plow is of course adapted to be guided by the operator grasping the handles 82. In this case also a single rear wheel is provided in line with the front wheel or caster, in place of the two wheels 2 of the plow disclosed in Sheets 1 to 3 inclusive. The rear wheel 85 has its shaft 87 journaled in a pair of swing arms 88 pivoted to and projecting rearwardly from the frame 28, and pivotally connected by a link 89 to the forwardly projecting end of the hand lever 13, said lever being provided with latch mechanism not shown, for engagement with the sector 15 secured to the rear end of one of the longitudinal frame bars 1. The operation of this lever which is linked by the connecting rod 12 with crank arm 21, effects simultaneous upward and downward movement of the wheels 7 and 85. When the wheels are secured in their most depressed position the plow 67 is carried above the ground and the same is true of the wheel 34. When the plow is in operation the wheels 7 and 85 are raised to inoperative position so that the wheel 34 may be utilized to effect propulsion of the machine and the plowing operation. In this case the shaft 34ª of the wheel 34 (of which there are preferably two as shown by Figure 7) is equipped with a worm wheel 35ª, meshing with a worm shaft 36ª suitably journaled at its lower end and having a bearing at its upper end in a casting 38ª secured in the box 6. At its upper end the worm shaft, which extends obliquely upward and forward, is equipped with a beveled gear 37ª, meshing with a beveled gear 39ª, on the shaft 80 of the engine or motor 47, which in this instance is mounted upon the rear end of the frame. The operation and control of this garden plow is in all essentials the same as that already described and therefore need not be recapitulated in detail. A plow of this character will be found of great advantage for light work and of course can be placed on the market at a comparatively low price.

From the above description it will be apparent that I have produced a plow embodying the features of advantage set forth as desirable and which is susceptible of modification in various particulars without departing from the principle of construction involved or sacrificing any of the advantages of the appended claims.

I claim:

1. A machine of the character described, comprising a frame, a plow carried by and depending from the frame, traction means carried by the frame for engaging the bottom of the furrow made by the plow, front and rear carrying wheels for the frame, means for adjusting the carrying wheels relative to the frame to lift the latter and withdraw the plow and traction means from the ground, or to raise the carrying wheels above the level of the lower side of the plow and traction means.

2. A machine of the character described, comprising a suitable frame, independent vertically adjustable rear carrying wheels for and at opposite sides of the frame, a plow carried by the frame, a propulsion device behind and engaging the bottom of the furrow made by the plow, means for operating the propulsion device, and supporting and guiding means for and at the front end of the frame.

3. A machine of the character described, comprising a suitable frame, independent vertically adjustable rear carrying wheels for and at opposite sides of the frame, a plow carried by the frame, a propulsion device behind and engaging the bottom of the furrow made by the plow, means for operating the propulsion device, and means for transmitting power to said carrying wheels.

4. A machine of the character described, comprising a suitable frame, rear carrying wheels for and at opposite sides of the frame, a plow carried by the frame, a propulsion device behind and engaging the bottom of the furrow made by the plow, means for operating the propulsion device, means for transmitting power to said carrying wheels, and means for adjusting either of the carrying wheels vertically with respect to said frame.

5. A machine of the character described, comprising a suitable frame, rear carrying wheels for and at opposite sides of the frame, a plow carried by the frame, a propulsion device behind and engaging the bottom of the furrow made by the plow, means for operating the propulsion device, means for transmitting power to said carrying wheels, means for adjusting either of the carrying wheels vertically with respect to said frame, and means for vertically adjusting the front end of said frame with respect to said supporting and guiding means.

6. A machine of the character described, comprising a suitable frame, rear carrying wheels for and at opposite sides of the frame, a plow carried by the frame, a propulsion device behind and engaging the bottom of the furrow made by the plow, means for operating the propulsion device, supporting and guiding means for and at the front end of the frame, a caster wheel supporting the front end of the frame, and means for turning the same for steering purposes.

7. A machine of the character described, comprising a suitable frame, a pair of rear carrying wheels at opposite sides of and vertically adjustable with respect to said frame, a caster supporting the front end of said frame and vertically adjustable relative to the latter, a plow suspended rigidly from said frame, a propulsion device carried by said frame rearwardly of said plow and adapted for tractional engagement with the bottom of the furrow made by the plow, a transmission gearing for operating said propulsion device, and a motor mounted on the frame for driving the transmission.

8. A machine of the character described, comprising a suitable frame, a pair of rear carrying wheels at opposite sides of and vertically adjustable with respect to said frame, a caster supporting the front end of said frame and vertically adjustable relative to the latter, a plow suspended rigidly from said frame, a propulsion device carried by said frame rearwardly of said plow and adapted for tractional engagement with the bottom of the furrow made by the plow, a transmission gearing for operating said propulsion device, a motor mounted on the frame for driving the transmission, and means for transmitting power from the transmission to said first-named wheels.

9. A machine of the character described, comprising a frame, a furrow turning device and a traction means carried by the frame with the said device in line with and forward of the traction means, an extension frame pivoted for up and down movement to the front end of the first-named frame and limited in its upward swinging movement by said first-named frame, a caster secured to the extension frame to run on the unbroken soil ahead of the said furrow-turning device, means for adjusting said extension frame, and vertically-adjustable wheels for and at opposite sides of the first-named frame.

10. A machine of the character described, comprising a frame, vertically-adjustable carrying wheels on and at opposite sides of said frame, a caster on the front end of the frame, a plow depending from the frame behind the caster, a longitudinally-extending boxing depending from the frame, behind the plow, traction devices behind the plow and at opposite sides of said boxing, a power device on the frame, a change-speed gear transmission on the frame, and means within said boxing for transmitting power from said gear transmission to said traction devices to propel the machine.

11. A machine of the character described, comprising a frame, vertically-adjustable carrying wheels, on and at opposite sides of said frame, a caster on the front end of the frame, a plow depending from the frame behind the caster, a longitudinally-extending boxing depending from the frame, behind the plow, traction devices at opposite sides of said boxing, a power device on the frame, a change-speed gear transmission on the frame, means for transmitting power from the transmission gearing to the traction devices and said side wheels, and means actuated by reversed application of power through the transmission, for reversing the direction of rotation of said carrying wheels.

12. In a machine of the character described, a frame, a plow and traction means behind the plow, a caster for supporting the front end of the frame, a power transmission on the frame, means for transmitting power therefrom to said traction means, crank-arms journaled upon a part of said transmission mechanism and provided with outwardly projecting stub shafts, carrying wheels journaled on said shafts and provided with notched hubs, wheels journaled on said stub-shafts and geared to said power transmission, double ended clutches pivoted to said gears and engaging the respective notched hubs, and spring-actuated friction shoes carried by said clutches and frictionally engaging circular portions of said crank-arms for reversing the positions of said clutches when the power through the transmission is reversed.

In testimony whereof, I affix my signature.

ERNEST H. KORSMEYER.